United States Patent
Helm et al.

[11] Patent Number: 6,157,834
[45] Date of Patent: Dec. 5, 2000

[54] TERRESTRIAL AND SATELLITE CELLULAR NETWORK INTEROPERABILITY

[75] Inventors: Jim E. Helm, Gilbert; Steve Magee, Scottsdale; James William Bishop, Jr., Chandler, all of Ariz.

[73] Assignee: Motorola, Inc., Schaumburg, Ill.

[21] Appl. No.: 08/998,565

[22] Filed: Dec. 29, 1997

[51] Int. Cl.[7] .............................. H04B 7/185; H04Q 7/20
[52] U.S. Cl. .................. 455/436; 455/436; 455/439; 455/427; 455/12.1
[58] Field of Search .................. 455/12.1, 13.1, 455/427, 428, 436, 555, 553, 430, 426; 370/331, 333

[56] References Cited

U.S. PATENT DOCUMENTS

| | | | |
|---|---|---|---|
| 5,161,248 | 11/1992 | Bertiger et al. | 455/33.2 |
| 5,551,058 | 8/1996 | Hutcheson et al. | 455/33.2 |
| 5,561,838 | 10/1996 | Chandos et al. | 455/13.1 |
| 5,574,968 | 11/1996 | Olds et al. | 455/12.1 |
| 5,619,525 | 4/1997 | Wiedeman et al. | 375/200 |
| 5,649,291 | 7/1997 | Tayloe | 370/332 |
| 5,649,308 | 7/1997 | Andrews | 370/334 |
| 5,669,061 | 9/1997 | Schipper | 455/429 |
| 5,678,184 | 10/1997 | Cutler. Jr. et al. | 455/33.2 |
| 5,790,528 | 8/1998 | Muszynski | 370/331 |
| 5,805,997 | 9/1998 | Farris | 455/461 |
| 5,826,188 | 10/1998 | Tayloe et al. | 455/428 |
| 5,867,765 | 2/1999 | Nilesson | 455/13.1 |
| 5,884,142 | 3/1999 | Wiedeman et al. | 455/12.1 |
| 5,918,157 | 6/1999 | Wiedeman et al. | 455/13.1 |
| 5,924,014 | 7/1999 | Vanden Heuvel et al. | 455/13.1 |
| 5,937,352 | 8/1999 | Courtney et al. | 455/435 |
| 5,966,658 | 10/1999 | Kennedy, III et al. | 455/426 |

FOREIGN PATENT DOCUMENTS

| | | | |
|---|---|---|---|
| 9628947 | 9/1996 | WIPO | H04Q 7/38 |

*Primary Examiner*—Daniel S. Hunter
*Assistant Examiner*—Meless Zewdu
*Attorney, Agent, or Firm*—Bradley J. Botsch; Frank J. Bogacz

[57] ABSTRACT

Interoperability between terrestrial cellular systems and satellite based cellular systems allows handoffs between different cellular systems. A call in progress by a subscriber unit (101) over a terrestrial based cellular system (100) which includes a mobile switching center (MSC) (105a) and a plurality of base stations (103a–d) is handed off to a satellite based cellular system (1000) comprising a satellite network (100a, 1001b), a regional gateway (1007) and an interface gateway (1005). A call in progress by subscriber unit (101) over satellite based cellular system (1000) is also handed off to terrestrial based cellular system (100). A dual mode subscriber unit (400) provides switching functionality (409) to switch between transmit modes.

10 Claims, 4 Drawing Sheets

TERRESTRIAL AND SATELLITE CELLULAR NETWORK INTEROPERABILITY

FIELD OF THE INVENTION

The present invention pertains to communications systems, in general, and to interoperability between terrestrial and satellite cellular communications networks, in particular.

BACKGROUND OF THE INVENTION

A cellular communication system projects a number of cells onto the earth. A frequency spectrum is allocated in frequency, in time, by coding, or a combination of these, to the cells so that communications taking place in nearby cells use different channels to minimize the chances of interference. On the other hand, communications taking place in cells located far apart may use the same channels, and the large distance between communications in common channels prevents interference. Over a large pattern of cells, a frequency spectrum is reused as much as possible by distributing common channels over the entire pattern so that only far apart cells reuse the same spectrum. An efficient use of spectrum results without interference.

One problem which cellular communications systems address is the handing-off of communications between cells, particularly between cells of different base stations or between different public land mobile networks (PLMNs) for terrestrial based cellular systems, and between cells of different satellites in satellite based cellular systems. Relative movements between end users and cells causes the end users and the communication links directed thereto to move between cells. In order to permit continuous communications in an ongoing call, the system must "handoff" the call when the end user (hereinafter "subscriber") crosses a cell boundary. If a call is not handed off to a new cell upon leaving an old cell, the call will eventually be lost because the strength of signals over which communications take place would diminish to a point where the subscriber's radio- telephone (hereinafter "subscriber unit") cannot receive the signal transmitted by the other terminating node, which may be another subscriber unit or a conventional telephone coupled to a public switched telephone network (PSTN), or vice versa.

Techniques exist for handing off calls between base stations in a terrestrial based cellular system, and between different terrestrial based cellular systems (i.e., between different PLMNs). Techniques exist for handing off calls between different satellites in a satellite based cellular system. Terrestrial based cellular systems do not provide coverage world wide. If a subscriber roams into uncovered territory during a call over a terrestrial based cellular system, the call eventually terminates due to loss in signal strength. Satellite based cellular systems provide much greater coverage, but are more costly. Accordingly, a need exists for providing interoperahility between terrestrial based cellular systems and satellite based cellular systems. In particular, a need exists for a method and system for allowing handoffs between terrestrial based cellular systems and satellite based cellular systems, including a dual-mode subscriber unit which permits a subscriber to communicate via either system.

BRIEF DESCRIPTION OF THE DRAWINGS

The invention will be better understood from a reading of the following detailed description taken in conjunction with the drawing in which like reference designators are used to designate like elements, and in which.

DETAILED DESCRIPTION

The present invention provides interoperability between terrestrial cellular systems and satellite based cellular systems to allow handoffs between different based cellular systems, when subscribers roam out of range of the originating cellular system while a call is in progress.

Figure 1:
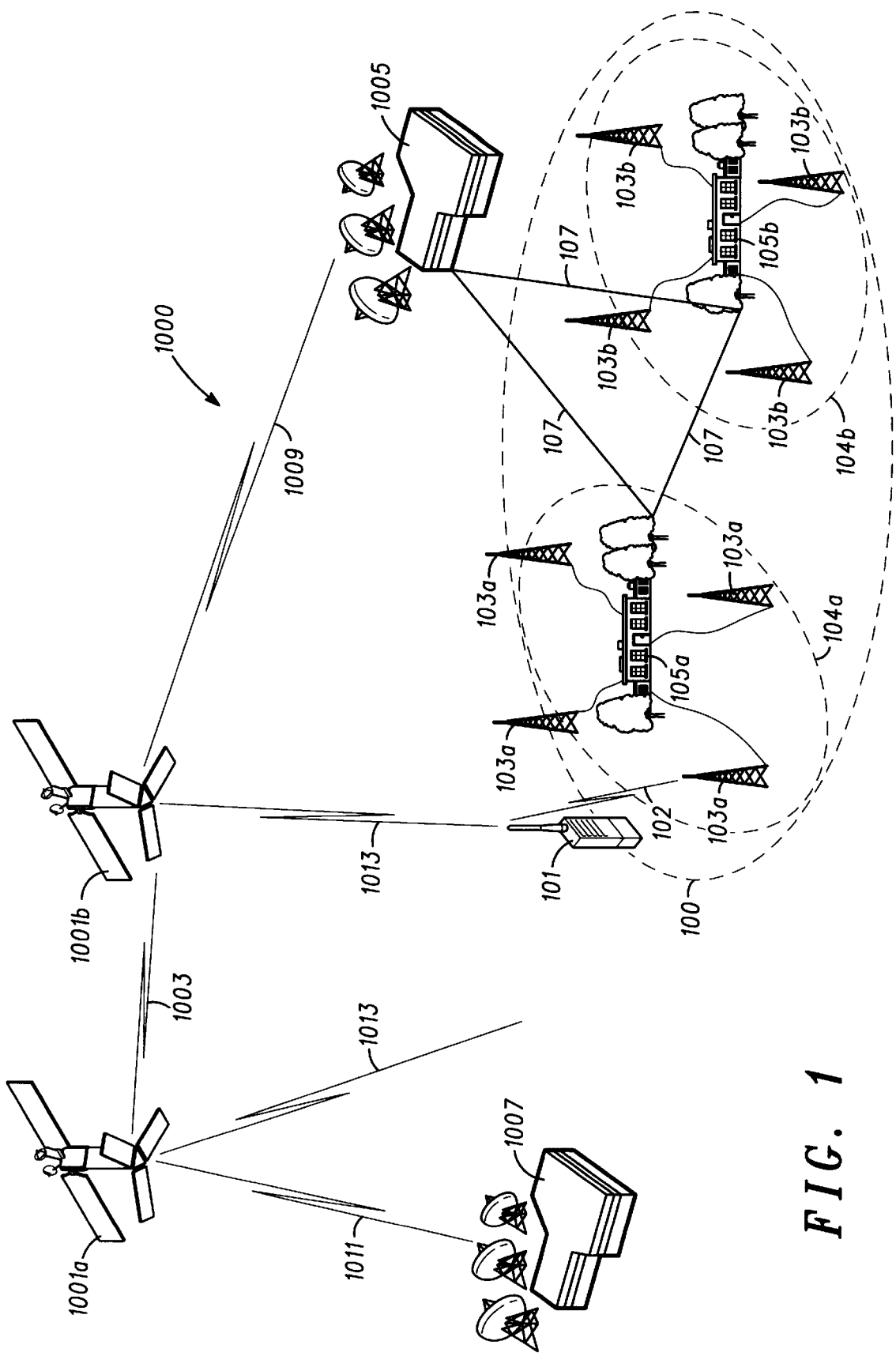
FIG. 1 is a diagram of a system in accordance with the invention.

FIG. 1 is a diagram of a system in accordance with the invention. As shown in FIG. 1, the system includes a terrestrial based cellular system 100 and a satellite based cellular system 1000. Terrestrial based cellular system 100 includes one or more Public Land Mobile Networks (PLMNs) 104a and 104b. Each PLMN 104a and 104b respectively includes a mobile switching center (MSC) 105a and 105b and a number of cell site antennas, or base stations 103a and 103b. MSCs 105a and 105b of PLMNs 104a and 104b are in communication over network connection 107, which may be a land link or a wireless communication link. Preferably, network connection 107 employs a standardized signaling protocol, such as the well-known SS7 protocol and one of the cellualr Mobile Application Part protocols (GSM or IS-41).

Satellite based cellular system 1000 includes a number of satellites 1001a and 1001 b in communication with each other over an inter-satellite cross-link 1003. Satellite based cellular system 1000 also includes an interface gateway 1005 which includes a mobile switching center. Satellite cellular system 1000 also includes a regional gateway 1007.

In operation, a call initiated within the control of PLMN 104a is in progress between subscriber unit 101 and a terminating node (not shown). Subscriber unit 101 communicates over cellular telephone link 102 to base station 103a. Base station 103a routes communication packets to and from MSC 105a. MSC 105a routes the communication packets to or from the terminating node, which may be another subscriber unit or a conventional telephone coupled to a public switched telephone network (PSTN). Accordingly, MSC 105a is preferably coupled to a PSTN or to an international switching center if the call is an international call.

In a conventional terrestrial cellular system, if subscriber unit 101 roams out of range of PLMN 104a and into the range of PLMN 104b, the call in progress continues uninterrupted via by performing a terrestrial based network-to-network (i.e., MSC 105a—to—MSC 105b) handoff over network connection 107. The originating MSC 105a, however, maintains the connenction to the PSTN, so the PSTN connection is not transferred when the subscriber unit 101 connection is transferred.

Normally, if subscriber unit 101 roams out of range of PLMN 104a while a call is in progress, the signal begins to fade and subscriber unit 101 sends a handoff request to MSC 105a. If MSC 105a determines that another terrestrial based cellular system (e.g., PLMN 104b) is either not available or not in range of subscriber unit 101, the handoff request is refused and the call loses signal strength until eventually the call terminates. The handoff request is refused even if a satellite based cellular system 1000 is available and would provide a strong signal for the call because the terrestrial based cellular systems and the satellite based cellular system employ different signaling protocols and handoff control.

In the present invention, if subscriber unit 101 begins roaming out of range of originating terrestrial based cellular system PLMN 104*a*, subscriber unit 101 sends a handoff request to MSC 105*a*. According to the invention, however, if MSC 105*a* determines that the satellite based cellular system 1000 will provide the most usable or strongest signal for the call, MSC 105*a* sends a handoff request via communication network 107 to interface gateway 1005 requesting a handoff to the satellite based cellular system 1000. Alternately, the subscriber unit may determine that the satellite system has the best signal and send an appropriate hard request to the MSC indicating such determination. The signaling signal is then routed from MSC 105*a* to gateway 1005, then through the satellite network (e.g., up through satellite link 1009 to satellite 1000*b*, and then over inter-satellite cross-link 1003 to satellite 1001*a*), and then down to regional gateway 1007 over satellite link 1011. Regional gateway 1007 controls the handoffs. Preferably, regional gateway 1007 provides the same seamless handoff functionality between terrestrial based cellular systems and the satellite based cellular system as it does between different satellites when a subscriber moves out of the footprint of one satellite and into the footprint of another satellite. One example implementation of this functionality is described in U.S. Pat. No. 5,574,968 to Olds et al, assigned to a common assignee, and is incorporated herein by reference. Regional gateway 1007 then determines that the call is to be handed off to satellite 1001*b*. Satellite 1001*b* thus becomes the target system for the handoff, and accordingly the communication and signaling for the call is transmitted through satellite 1001*b* over satellite link 1009 to MSC 1005, and then through MSC 105*a* over network communication 107 to base station 103*a*, and over link 102 to subscriber unit 101, directing it to pick up the signal over link 1013. Subscriber unit 101 then switches links from link 102 to link 1013 and the call continues uninterrupted. At this time, communications flow to and from subscriber unit 101, via link 1013, satellite 1001*b*, link 1009, interface gateway 1005, communication network 107, and MSC 105*a*, which routes the communication to the terminating node. Accordingly, MSC 105*a* retains its status as the terminating, controlling switch which, if the call is to a conventional telephone, routes the communications onto the PSTN (not shown). In other words, as long as the telephone call is in progress, MSC 105*a* is always the controlling switch. When the call ends, so does MSC's 105*a* role as the interface into the PSTN.

In the embodiment of FIG. 1, interface gateway 1005 includes at least a subset of the functionality of regional gateway 1007. Interface gateway 1005 includes means for communicating with terrestrial MSCs 105*a* and 105*b*, and may also be coupled to a PSTN or international switching center. The well-known standard IS-41 provides for basic handoff between two dissimilar switches in the United States. Accordingly, in the U.S., gateway 1005 is preferably compatible with the IS-41 protocol. In Europe, where GSM is the standard, interface gateway 1005 is compatible and based on a GSM switch with GSM protocols.

Regional gateway 1007 includes an interface into the satellite network, which allows it to send data and control messages to satellites in the network. Regional gateway 1007 also includes the home location record register and the network control attributes. Regional gateway 1007 also includes network control means for controlling communication handoffs between satellites in the satellite network and in setting up home location registers. Interface gateway 1005 includes. call and signaling capabilities that exist within regional gateway 1007, but typically does not include the system control aspects of the regional gateway 1007. Accordingly, in the embodiment of FIG. 1, regional gateway 1007 must always be contacted to perform a handoff to the satellite system. Preferably, satellite based cellular systems are provided with a minimal number of regional gateways. This allows more interface gateways to be implemented at lower costs, and therefore also reduces tail charges associated with accessing the interface gateway.

Regional gateway 1007 is the control gateway for satellite based cellular system 1000 which maintains all of the home location records and performs all of the functionality of a controlling switch. Accordingly, regional gateway 1007 performs the control of handoffs to and from satellite based cellular system 1000 and terrestrial based cellular systems PLMNs 104*a* and 104*b*.

Figure 2:
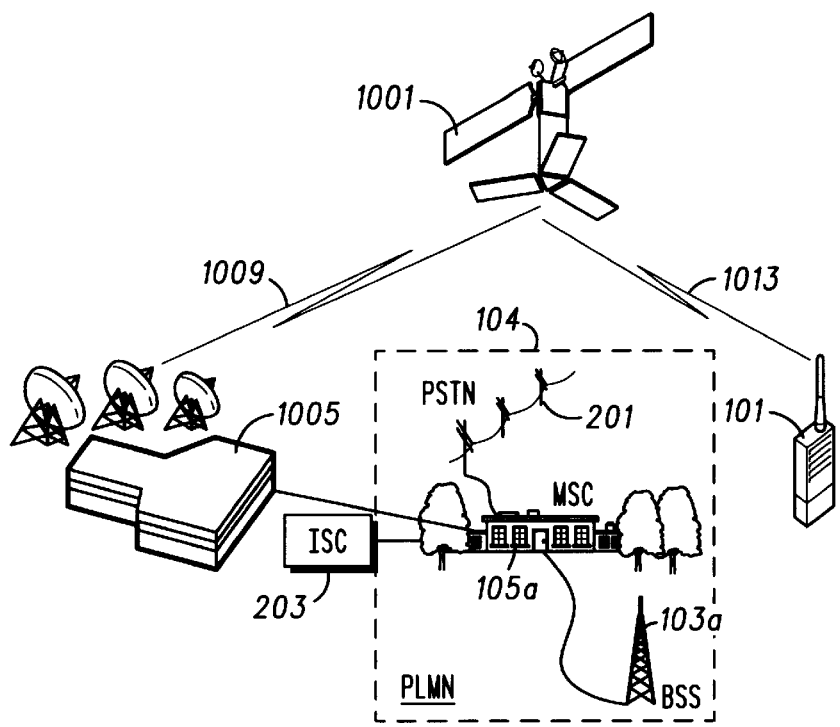
FIG. 2 is a diagram of a call flow path for the system of FIG. 1.

FIG. 2 is a diagram of a call flow path which illustrates a phone call occurring within terrestrial based cellular system 100. Subscriber unit 101 communicates through base station 103*a* to MSC 105*a* out to PSTN 201, for example. As subscriber unit 101 moves out of range, it begins to lose signal strength from base station 103*a*. Accordingly, subscriber unit 101 requests a handoff. The handoff request is passed through base station 103*a* to MSC 105*a*. MSC 105*a* determines whether another base station (103) within PLMN 104*a* is within range of subscriber unit 101 to handoff the call to, or whether another PLMN 104*b* or satellite based cellular system 1000 is in a better position to provide strong signal strength for the phone call. Preferably, MSC 105*a* chooses the system which will provide the strongest signal strength for the call, while also taking into consideration cost factors.

Several methods exist for determining which system to hand the call off to. In one embodiment, MSC 105*a* requests over the data circuit channel a signal quality value from one or more adjoining MSCs 105*b* for subscriber unit 101 whose signal is getting weak going through base station 103*a*. MSC 105*a* chooses the best candidate for the handoff. Assuming the satellite based cellular system 1000 is the chosen candidate, MSC 105*a* acquires an unused trunk between itself and interface gateway 1005.

In an alternative embodiment, subscriber unit 101 sends a candidate network handoff list to MSC 105*a*. MSC 105*a* chooses a network from the list. If the satellite based cellular system is chosen, the regional gateway 1007 is contacted to assign a channel and path, and subscriber unit 101 is directed to synchronize and change modes to communicate with the satellite based cellular system.

Figure 3:
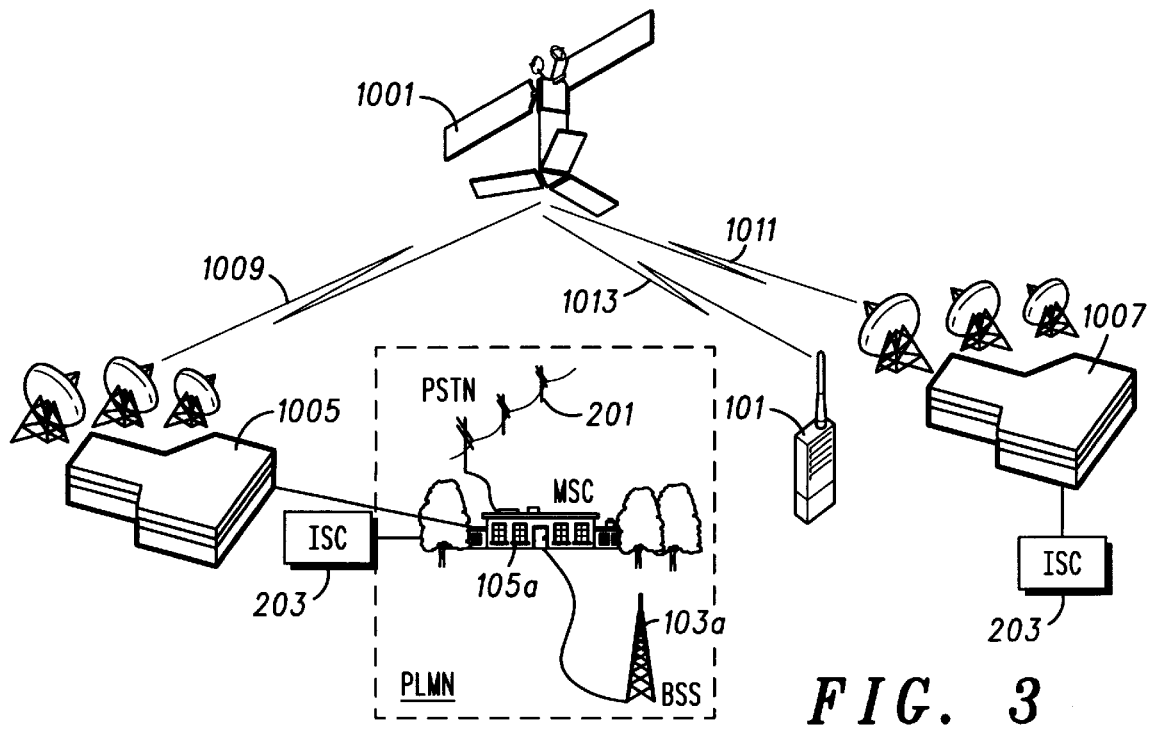
FIG. 3 is a diagram of a signaling flow path for the system of FIG. 1.

FIG. 3 is a diagram of the signaling flow path of the example call described in FIG. 2, assuming that MSC 105*a* has determined that the call should be handed off to satellite based cellular system 1000. As shown in FIG. 3, the signaling for the call flows between subscriber unit 101 through base station 103*a* to MSC 105*a*. MSC 105*a* routes the signaling to gateway 1005 which routes it through satellite 1001 via link 1009 to regional gateway 1007 via link 1011. Regional gateway 1007 processes the handoff request and determines that the call should be handed off to satellite 1001. The handoff signaling information flows back through satellite 1001 over satellite link 1011 to gateway 1005 over satellite link 1009, to base station 103 to subscriber unit 101, which directs subscriber unit 101 to handoff to satellite 1001 and to communicate over link 1013. The communication data passes from subscriber unit 101 through satellite 1001 and then through gateway 1005 to MSC 105*a* and out to PSTN 201 or to international switching center 203 if the telephone call is an international call instead of a local call.

Unlike present day international switching techniques, where calls must flow through the international switching center to conduct an international call, the present invention allows the international switching center to be bypassed in order to avoid long distance telephone charges after a handoff occurs.

Figure 4:
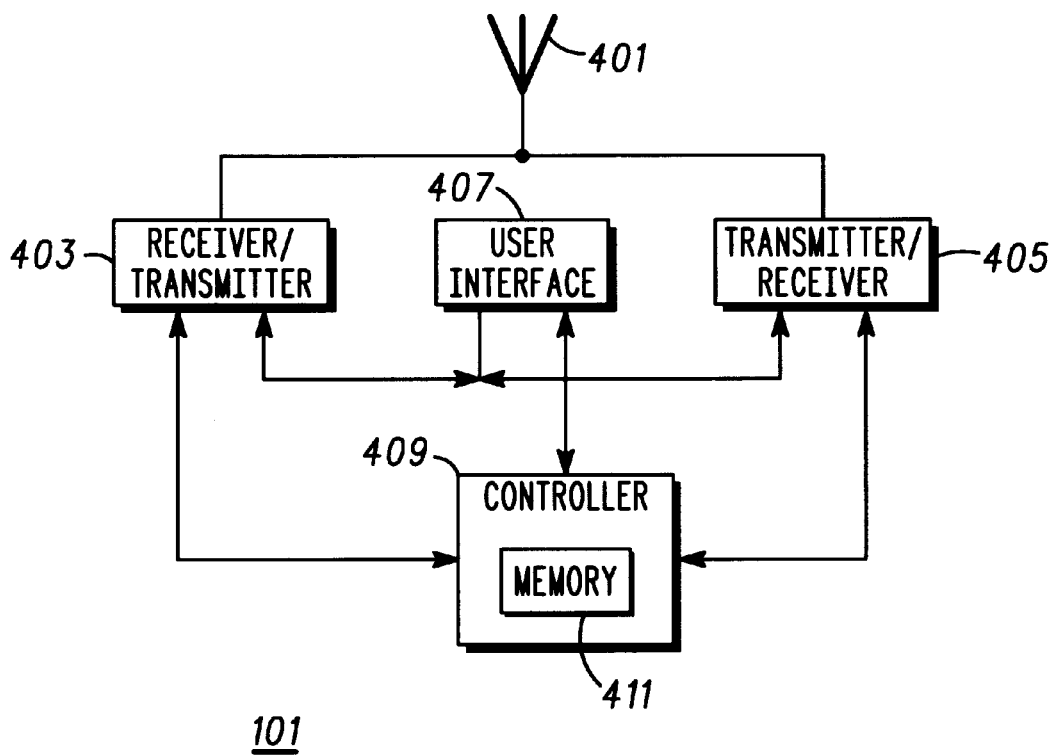
FIG. 4 is a block diagram of a dual mode subscriber unit in accordance with the invention.

Subscriber unit 101 preferably comprises a dual mode subscriber unit which operates as a switch with a processor to determine when to switch and to which mode. FIG. 4 is a block diagram of one embodiment of a dual mode subscriber unit 101 in accordance with the invention. Dual mode subscriber unit 101 includes a dual mode antenna 401 which is operable at the satellite link frequencies (such as K-band or L-band) and at terrestrial cellular frequencies. Dual mode antenna 401 is coupled to a cellular phone transceiver 405 and to a satellite transceiver 403. A user interface 407 is coupled to both transceivers 403 and 405. User interface 407 includes typically a microphone, a speaker, a display and a key pad. Dual mode subscriber unit 101 also includes a controller 409 that controls the operation of transceivers 403 and 405. Controller 409 preferably includes a digital signal processor and in addition includes a memory 411 which contains the operational programs for controlling operation of the controller 409.

Figure 5:
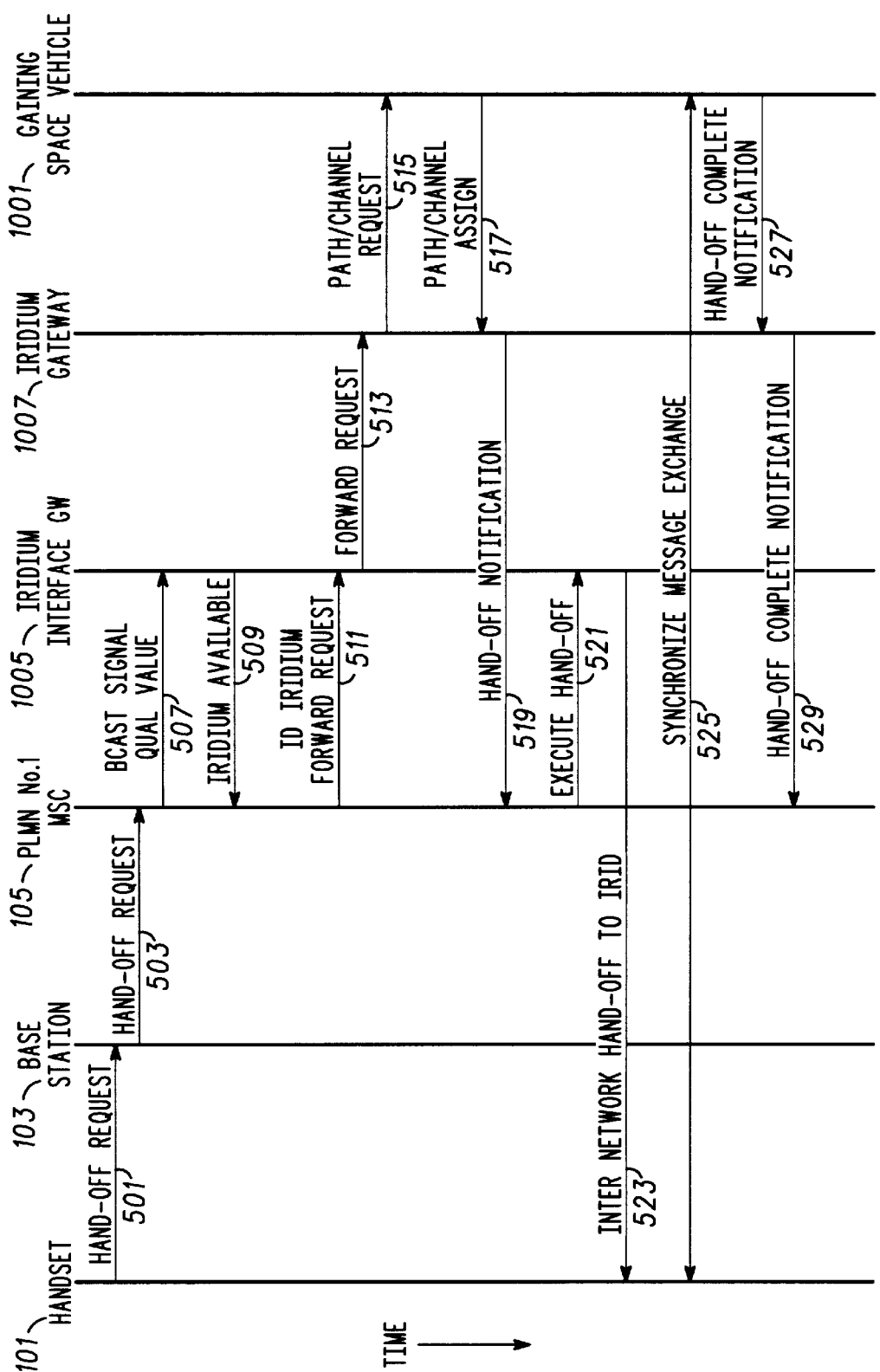
FIG. 5 is a signal flow diagram.

FIG. 5 is a signaling flow diagram illustrating the operation of the dual mode subscriber unit of FIG. 4 when performing a subscriber link handoff. As shown in FIG. 5, subscriber unit 101 sends a handoff request in step 501 to base station 103a over link 102. Base station sends the handoff request to MSC 105a in step 503. MSC 105a sends out a broadcast signal qualification value in step 507, which is received by interface gateway 1005. Interface gateway 1005 sends back a signal in step 509 indicating that the satellite 1001 is available. MSC 105a identifies satellite 1001 as the handoff destination and forwards the hand-off request to interface gateway 1005 in step 511. Interface gateway 1005 forwards the handoff request to the regional gateway 1007 (via link 1009, satellite 1001b, crosslink 1003, satellite 100a, and link 1011) in step 513. Then, regional gateway 1007 sends a path/channel request to satellite 100 lb (via link 1011, satellite 1001a, and cross-link 1003) in step 515. Satellite 1001b assigns a path and a channel and sends a path/channel assignment back to regional gateway 1007 (via cross-link 1003, satellite 1001a, and link 1011) in step 517. Regional gateway 1007 then sends a handoff notification to MSC 105a (via link 1011, satellite 1001a, cross-link 1003, satellite 100b, link 1009, interface gateway 1005, communications network 107) in step 519. MSC 105a then directs interface gateway 1005 over communications network 107 to execute the handoff in step 521. Interface gateway 1005 then sends the handoff instruction to subscriber unit 101 via links 1009 and 1013 in step 523, which instruct the subscriber unit 101 to execute the hand-off. Synchronization messages are then exchanged between subscriber unit 101 and satellite 1001b over link 1013 in step 525. A hand-off complete notification message is then sent from satellite 1001B to regional gateway 1007 (via crosslink 1003, satellite 1001 a, and link 1011) in step 527. Finally, regional gateway 1007 sends a handoff complete notification back to MSC 105a (via link 1011, satellite 1001 a, crosslink 1003, satellite 1001 b, link 1009, interface gateway 1005, communications network 107) in step 529.

At the same time, dual mode subscriber unit 101 monitors broadcast signal which flow through the satellite network via transceiver 403. Preferably, this functionality resides in controller 409 along with memory 411. User interface 407 preferably includes a vocoder which converts the subscriber's voice to a digital representation of the voice. The digitized voice is formatted and packetized into digital voice packets. If the call is within the terrestrial based cellular system, the digitized voice packets are transmitted by transceiver 405 through antenna 401 onto link 102 to base station 103a. At the same time, dual mode subscriber unit 101 monitors broadcast signaling data from satellite 1001 over link 1013 using transceiver 403. If it detects that it is losing signal strength on transceiver 405, dual mode subscriber unit 101 requests a hand-off. The handoff request is transmitted over antenna 401 over link 102 to base station 103a, and then to MSC 105a. If MSC 105a determines that there is no other base station 103a or other PLMN 104b that it can hand-off the call to, if forwards the handoff request to interface gateway 1005 which routes it through the satellite network to regional gateway 1007. Once authorization for the handoff is obtained, MSC 105a directs subscriber unit 101, via base station 103a, link 102, antenna 401, and transceiver 405, to switch communication transmission paths. Thus instead of transmitting and receiving through transceiver 405, controller 409 redirects data to be transmitted and received by transceiver 403 via antenna 401 over link 1013 up to satellite 1001. Then transceiver 405 is preferably used to monitor signaling information over the terrestrial network, as for example, to determine if a handoff is occurring.

Controller 409 preferably includes intelligence for preventing the subscriber unit 101 from switching back and forth from satellite based cellular system to terrestrial base cellular system and vice versa in an endless loop. Preferably this intelligence prevents a hand-off from occurring before a minimum time period. Alternatively, the intelligence can require a good signal strength on the terrestrial for minimum amount of time. Also, the subscriber unit may include a vocoder for each network to support unique coding schemes.

In one embodiment, automatic mode would default to a terrestrial based cellular system if one is available, and only handoff to a satellite based cellular system if a strong signal cannot be received from a terrestrial base cellular system. As a further enhancement, if dual mode subscriber unit is on a satellite based cellular system, the controller includes means for determining when a terrestrial based cellular system becomes available (and over which dual mode subscriber unit will receive a strong signal). These enhancements are desirable if the costs of setup and air time are lower over terrestrial based cellular systems. As will be appreciated by those skilled in the art, the enhancements just described can be configured to operate in reverse if the costs are lower over the satellite based cellular systems.

The controller may also be configured to allow the subscriber to select a pure cellular mode or a pure satellite mode. One implementation of this feature is to program the mode via the subscriber unit keypad.

The forgoing description is directed to performing a handoff from a terrestrial based cellular system to a satellite based cellular system. The process also operates in reverse to handoff a call from a satellite based cellular system to a terrestrial based cellular system. In this case, subscriber unit 101 sends a handoff request to regional gateway 1007. Regional gateway 1007 send forwards the handoff request to the controlling interface gateway 1005, which determines which PLMN to handoff the call to. This is determined either by requesting a signal strength value from each potential terrestrial based cellular system cell and comparing the values to determine the best candidate based on signal strength, or by the subscriber unit identifying the availability of terrestrial based cellular cell sites or by sending a cell site candidate list to subscriber unit 101 to let it select the system or cell to send the handoff request to. Controlling interface gateway 1005 then sends the handoff request to the MSC of the selected terrestrial based cellular system PLNW 104a or 104b. The MSC determines which base station within its network to handoff the call to. This is preferably achieved in a manner similar to selecting which terrestrial based system to hand off the call to (i.e., by comparing signal strength values from each base station, or by allowing the subscriber unit 101 to select the base station). MSC 105a or 105b determines a communication path and a channel assignment, preferably via communication and advise of the assigned base station, through which subscriber unit 101 shall communicate with the assigned base station. Subscriber unit 101 receives the communication path and said channel assignment, switches to the channel specified by the channel assignment, and continues the call by sending communications over the assigned channel via the assigned communication path.

The invention described herein provides a solution for achieving interoperability between terrestrial based cellular systems and satellite based cellular systems. Although the invention has been described in terms of the illustrative embodiment, it will be appreciated by those skilled in the art that various changes and modifications may be made to the illustrative embodiment without departing from the spirit or scope of the invention. It is intended that the scope of the invention not be limited in any way to the illustrative embodiment shown and described but: that the invention be limited only by the claims appended hereto.

What is claimed is:

1. A method for automatic handoff of a subscriber unit telephone call, wherein said subscriber unit is operable with a terrestrial based cellular system and a satellite based cellular system, comprising the steps of:

(a) sending a handoff request from a subscriber unit to a base station of said terrestrial based cellular system, said subscriber unit being operable with said terrestrial based cellular system and said satellite based cellular system;

(b) said base station forwarding said handoff request to a mobile switching center of said terrestrial based cellular system;

(c) forwarding said handoff request to a gateway of said satellite based cellular system;

(d) said gateway determining at least one of said satellites of said satellite based cellular systems to be used by said subscriber unit;

(e) transferring synchronizing messages between said at least one of said satellites and said subscriber unit; and (f) establishing a communications channel between said subscriber unit and said at least one of said satellites, wherein handoff from said terrestrial based cellular system and said satellite based cellular system is performed by the interaction between said subscriber unit, said base station, said mobile switching center and said gateway and not primarily by said subscriber unit interacting independently with said base station, said mobile switching center and said gateway.

2. A method in accordance with claim 1, further comprising:

receiving a subsequent second handoff request from said subscriber unit; and causing said telephone call to be handed off from said satellite based cellular system to said terrestrial based cellular system.

3. A method in accordance with claim 2 wherein:

said terrestrial based cellular system includes a plurality of cells.

4. A method in accordance with claim 2, wherein receiving said second subsequent handoff request occurs while said telephone call is established through said satellite based cellular system.

5. A method in accordance with claim 3, further comprising the steps of:

determining which one of a plurality of terrestrial cells of said terrestrial based cellular system to hand off said telephone call; and causing said telephone call to be handed off to said one of said plurality of terrestrial cells.

6. The method of claim 1 further wherein the step of forwarding said handoff request includes the steps of:

sending a broadcast signal from said mobile switching center to an interface gateway;

sending an acknowledgement signal from said interface gateway to said mobile switching center; and sending a satellite identification signal from said mobile switching center to said interface gateway; and forwarding said handoff request to said gateway.

7. The method of claim 1 further including the steps of:

said gateway requesting a channel from said at least one of said satellites; and said at least one of said satellites assigning a channel and providing a reply signal back to said gateway.

8. A system for automatic handoff of a subscriber unit telephone call, wherein said subscriber unit is operable with a terrestrial based cellular system and a satellite based cellular system, said satellite based cellular system having a plurality of satellites associated therewith, comprising:

a subscriber unit being interoperable with said terrestrial based cellular system and said satellite based cellular system;

a base station within said terrestrial based cellular system, said subscriber unit sending a handoff request to said base station;

a mobile switching center within said terrestrial based cellular system, said base station forwarding said handoff request to said mobile switching center;

a gateway of said satellite based cellular system, said mobile switching center forwarding said handoff request to said gateway, said gateway determining at least one of said plurality of satellites of said satellite based cellular systems that is to be used by said subscriber unit for use in establishing a communication between said subscriber unit and said at least one of said plurality of satellites, wherein handoff from said terrestrial based cellular system and said satellite based cellular system is performed by the interaction between said subscriber unit, said base station, said mobile switching center and said gateway and not primarily by said subscriber unit interacting independently with said base station, said mobile switching center and said gateway.

9. The system of claim 8 further including an interface gateway for receiving a broadcast signal from said mobile switching center and for sending an acknowledgement signal back to said mobile switching center.

10. The system of claim 8 wherein said gateway requests a channel from said at least one of said plurality of satellites and wherein said at least one of said plurality of satellites assigns a channel and provides a reply signal back to said gateway.

* * * * *

UNITED STATES PATENT AND TRADEMARK OFFICE
CERTIFICATE OF CORRECTION

PATENT NO. : 6,157,834  
DATED : December 5, 2000  
INVENTOR(S) : Jim E. Helm et al.

Page 1 of 1

It is certified that error appears in the above-identified patent and that said Letters Patent is hereby corrected as shown below:

Column 7,
Line 56, delete "second".
Line 65, delete "second".

Signed and Sealed this

Twenty-third Day of April, 2002

Attest:

Attesting Officer

JAMES E. ROGAN
Director of the United States Patent and Trademark Office